March 9, 1948. A. C. ALLEN 2,437,371
ABSOLUTE PRESSURE GAUGE
Filed Feb. 4, 1944 2 Sheets-Sheet 1

Inventor:
Arthur C. Allen
By Williams, Bradbury & Hinkle
Attorneys

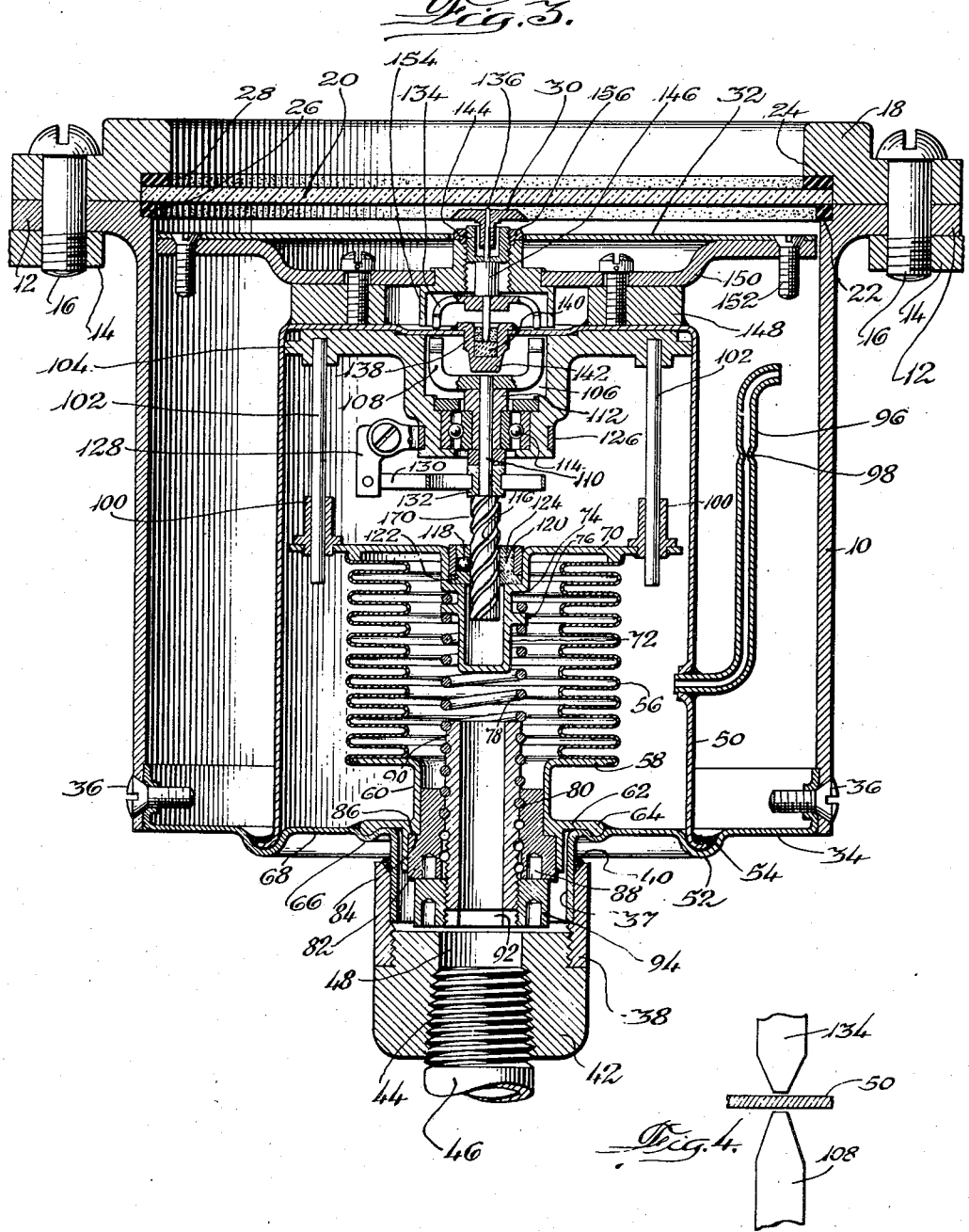

Patented Mar. 9, 1948

2,437,371

UNITED STATES PATENT OFFICE 2,437,371

ABSOLUTE PRESSURE GAUGE

Arthur C. Allen, Chicago, Ill., assignor to Stewart-Warner Corporation, Chicago, Ill., a corporation of Virginia Application February 4, 1944, Serial No. 521,085

6 Claims. (Cl. 73—410)

My invention relates to absolute pressure gauges and more particularly to gauges of a type adapted to measure variations in pressure in the intake manifold of an aircraft or other supercharged engine.

There is at present great need for a simple and effective pressure gauge which can be utilized to measure variations in absolute pressure in the intake manifold of an aircraft engine or other engine of the supercharged type and wherein pressure variations occur over a range which extends both above and below normal atmospheric pressures. An object of my invention is to provide such an absolute pressure gauge.

Another object of my invention is to provide a new and improved absolute pressure gauge having simple, accurate, and efficient means for translating linear motion into rotary motion without trigonometric error.

Another object of my invention is to provide a new and improved absolute pressure gauge which can be quickly and inexpensively manufactured by conventional methods and machinery and which will be accurate and reliable in use.

Another object of my invention is to provide a new and improved absolute pressure gauge having a minimum frictional resistance and wherein such frictional resistance as does exist will remain constant throughout the life of the instrument.

Another object of my invention is to provide a new and improved absolute pressure gauge which may be readily calibrated by the manufacture and which will retain this calibration throughout its period of use.

Another object of my invention is to provide a new and improved absolute pressure gauge which may be readily applied to existing aircraft and other machines having supercharged engines.

Another object of my invention is to provide an absolute pressure gauge having new and improved means for translating pressure variations into rotary motion.

Other objects and advantages will become apparent as the description proceeds.

In the drawings:

Fig. 3 is a sectional view taken on the line 3—3 of Fig. 1; and

Fig. 4 is a partial, vertical, sectional view taken at right angles to Fig. 3 and showing a detail of the magnet pole construction.

Figure 1:
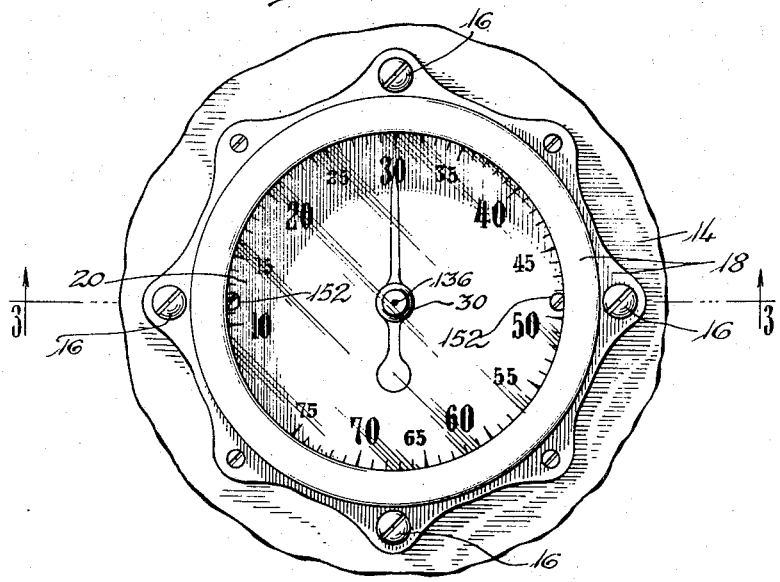
Fig. 1 is a front elevation of an absolute pressure gauge embodying a preferred form of my invention.
Figure 2:
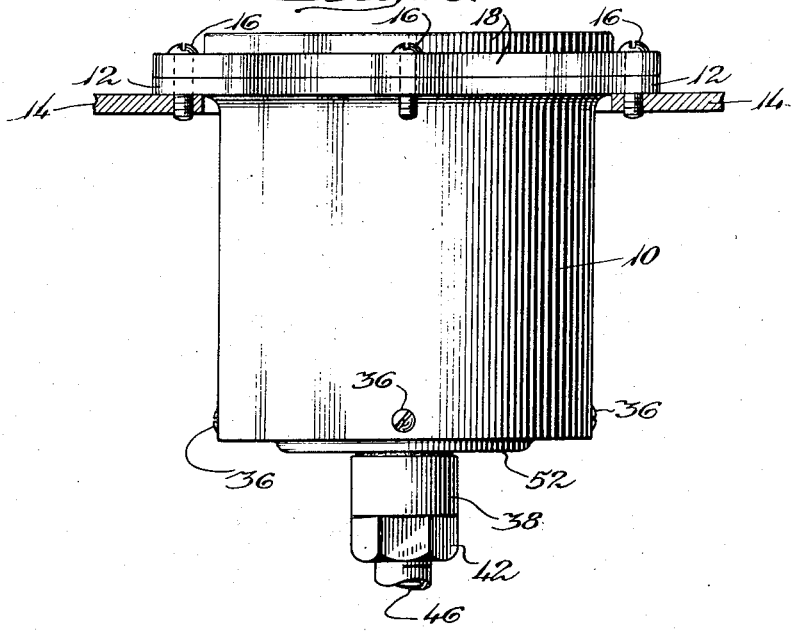
Fig. 2 is a side elevation of the absolute pressure gauge shown in Fig. 1.

The embodiment of my absolute pressure gauge which I have illustrated in the drawings is shown as comprising a cylindrical casing 10 having an outwardly directed flange 12 at its upper end which is adapted to be attached to any suitable support 14, such, for example, as the instrument panel of an aircraft. The casing 10 is attached to the support 14 by a plurality of screws 16 which also pass through a ring 18 and secure the latter to the flange 12 and support 14. A glass 20 is clamped between opposed shoulders 22 and 24 of the case 10 and ring 18, respectively, and washers 26 and 28, preferably of resilient material, may be interposed between the glass 20 and shoulders 22 and 24 to hold the glass firmly in place while protecting it against breakage. The glass 20 is transparent and permits the operator of the aircraft or other machine to view a movable pointer 30 which rotates relative to a fixed dial 32 having suitable indicia printed or otherwise marked thereon.

A sheet metal base 34 is attached to the lower end of the case 10, as by screws 36, and this base has a downwardly extending tubular portion 37 to which a sleeve 38 is welded or otherwise secured, as indicated at 40. The lower end of the sleeve 38 is threaded to receive the threaded upper end of a block 42 having a pipe thread 44 whereby a pipe 46 may be secured to this block to connect the gauge with the intake manifold of an engine. The block 42 has a bore 48 communicating with the interior of the pipe 46 and forming an extension of the passage therethrough.

A cup-shaped member 50 has its lower end located in an annular depression 52 in the base 34 and this depression is filled with solder 54, or other suitable material, forming a sealed connection between the lower end of the member 50 and the base 52. A bellows 56 of sheet metal, or other suitable material, is located in the member 50 and the lower end of this bellows is sealed to the annular flange 58 of a support 60. This support has a second flange 62 terminating in an enlargement 64 located in an annular groove 66 in the base 34 and welded or soldered to the base to form a sealed joint therebetween. The cup-shaped member 50, support 60 and the portion 68 of the base which is located between annular grooves 52 and 66 cooperate to form a sealed housing enclosing the bellows 56.

The upper end of the bellows 56 is sealed to a plate 70 which moves up and down as the bellows 56 extends and contracts. The plate 70 has a downwardly extending tubular portion 72 provided with a shoulder 74 and a threadlike flange 76 which is screwed into one end of a tension spring 78 which tends to contract the bellows 56. The lower end of the spring 78 is screwed into a threadlike groove 80 in an adjusting sleeve 82 which is rotatable in the support 60 and has a shoulder 84 abutting a complementary shoulder 86 provided by the support. The adjusting sleeve 82 is provided with bores 88 which may be engaged by the pins of an adjusting wrench to rotate the sleeve and thereby apply greater or less tension to the spring 78.

A tube 90 has a threadlike groove in its external wall whereby this tube may be screwed into the lower end of the spring 78. To facilitate this operation, the lower end of the tube is provided with a kerf 92 which may be engaged by a screwdriver or similar tool to rotate the tube 90. Adjustment of the sleeve 82 increases or decreases the tension of the spring 78, whereas rotation of the tube 90 increases or decreases the effective length of this spring. After the instrument has been properly calibrated, nut 94 is screwed onto the threaded lower end of tube 90 and serves to lock both the tube 90 and sleeve 82 in adjusted position. Such adjustment is made before the block 42 and pipe 46 are connected to the instrument. Under normal conditions, this calibration need not be disturbed after the instrument leaves the factory in which it is made.

The tube 90 connects the interor of the bellows 56 with bore 48 and pipe 46, so that the pressure in the interior of the bellows fluctuates with fluctuations in pressure in the intake manifold of the engine. The housing surrounding this bellows is evacuated to substantially an absolute vacuum by connecting a vacuum pump to tube 96 whose lower end is sealed in an opening in the cup-shaped member 50. After the housing has been evacuated to the desired extent, this tube is sealed, as indicated at 98, and the vacuum pump is then disconnected from the tube. Such evacuation of the housing takes place before the housing is assembled in the case 10.

Guiding sleeves 100 are attached to the plate 70 and slidably receive pins 102 mounted in a casting 104 brazed or otherwise secured to the closed upper end of the cup-shaped member 50. This casting provides a magnet chamber 106 in which a U-shaped permanent magnet 108 is rotatably mounted on the reduced upper end of a magnet shaft 110. This shaft has a bushing 112 rotatably mounted in a ball bearing 114 supported in the casting 104. The enlarged lower end of this shaft is provided with three inclined parallel grooves 116, each of which is engaged by a ball 118 located in an individual pocket provided by an annular spacing member 120 located between a bottom plate 122 and a ringlike cover 124. This construction is such that the balls 118 are held against rotation about the axis of the shaft 110 as the bellows expands and contracts and moves these balls up and down. Such movement produces rotation of the magnet shaft 110 and this shaft, therefore, always assumes a position corresponding to the pressure differential between the interior and exterior of the bellows 56.

In order to prevent any play between the balls 118 and grooves 116 from affecting the accuracy of the instrument, I preferably provide special means to hold these balls always in contact with the same side of the grooves 116. In Fig. 3 of the drawings, I have shown a collar 126 attached to the lower end of the casting 104 and carrying a bracket 128. This bracket forms a fixed support for one end of a spiral spring 130 whose other end is attached to a collar 132 rotatable with the magnet shaft 110. The spring 130 is an extremely light spring and functions merely to hold one side of the grooves 116 in engagement at all times with the balls 118.

The magnet 108 serves to attract the oppositely magnetized ends of a second U-shaped permanent magnet 134 mounted on the pointer shaft 136. The lower end of the pointer shaft is mounted in jewels 138 and 140 carried in a bearing cup 142 affixed to the upper end of the member 50. This member 50 is made of brass or other non-magnetic material, so that it does interfere with the attraction of the two permanent magnets for each other. The upper end of the pointer shaft 136 is journaled in a bearing 144 and the enlarged central portion 146 cooperates with this bearing to prevent longitudinal movement of the pointer shaft.

A ring 148 is brazed or otherwise secured to the upper end of the member 50 and forms a support for a metal plate 150 to which the dial 32 is secured by screws 152, or in any other suitable manner. This plate 150 has centrally affixed thereto a bushing 154 into which the pointer shaft bearing 144 is threaded. A locking ring 156 may be screwed onto the upper end of the bearing 144 to prevent accidental displacement of this bearing.

From the foregoing description taken in connection with the accompanying drawings it will be apparent that I have provided a simple and effective absolute pressure gauge which requires no electrical connections and may be readily applied to existing aircraft as well as to aircraft in process of manufacture. This absolute pressure gauge is designed to be manufactured and assembled by conventional methods and with the use of conventional equipment and is so arranged that it can easily be calibrated to furnish an accurate reading and such calibration will be retained throughout the life of the instrument.

An important feature of my invention lies in the simplicity and accuracy of the mechanism for converting the linear movement caused by expansion and contraction of the bellows into rotary movement. The bellows expands or contracts a uniform amount for each increment of increase or decrease in the pressure therein. The grooves 116 are of uniform pitch so that these grooves and the balls 118 convert the increments of linear motion of the bellows into uniform angular movements of the driving shaft 110 about its longitudinal axis. These angular movements of the driving shaft 110 are transmitted without change to the pointer 30 so that this pointer moves through a uniform distance for each increment of increase or decrease of pressure in the bellows 56.

In the instrument heretofore used, it has been common to provide levers for transmitting movement to the instrument pointer or corresponding member. Such levers are subject to trigonometric error in that they variably transmit movement from a driving member to a driven member. In order to overcome this trigonometric error it has heretofore been customary to provide indicating instruments with compensating mechanism which increases the cost of manufacture and produces a structure which is more complex, less efficient, less durable and less reliable under service conditions. My invention provides a simple means for uniformly translating linear motion into rotary motion which avoids such trigonometric errors and eliminates the need for compensaing mechanism.

The use of two permanent magnets in lieu of one magnet and a magnetic but unmagnetized bar prevents accidental displacements of the pointer through an angle of 180° and insures proper relationship between the pointer and operating magnet 108 under all conditions. The accuracy of the instrument is further increased by tapering the ends of the magnet poles, as best shown in Fig. 4, so that the diametral center line of one magnet is always directly above that of the other magnet.

While I have illustrated and described only a single embodiment of my invention, it is to be understood that my invention is not limited to the particular details shown and described, but may assume numerous other forms and that my invention includes all modifications, variations and equivalents coming within the appended claims.

I claim:

1. An absolute pressure gauge of the class described, comprising an evacuated housing, a bellows located in said housing, a fixed support for one end of said bellows, a tension spring attached to the other end of said bellows, a sleeve surrounding one end of said spring and threadedly engaging said spring, said sleeve and support having abutting shoulders, said sleeve being rotatable relative to said spring and support to adjust the tension of said spring, means for connecting said bellows through said sleeve with a source of variable pressure, and indicating means operated by expansion and contraction of said bellows.

2. An instrument of the class described, comprising an evacuated housing, a bellows located therein, a fixed support for one end of said bellows, a tension spring attached to the other end of said bellows, a rotatable member threadedly engaging and surrounding an end of said spring, said member and a part rigid with said housing providing abutting shoulders whereby rotation of said member changes the tension of said spring, a tube threadedly engaging the interior of said spring and rotatable therein to vary the effective length of said spring, means for connecting said bellows through said tube with a source of variable pressure, and indicating means operated by expansion and contraction of said bellows.

3. An instrument of the class described, comprising a housing, a bellows located in said housing, a tension spring attached at one end to one end of said bellows, said bellows being fixedly supported at its other end, a sleeve threadedly engaging the opposite end of said spring and rotatable relative thereto to vary the tension of said spring, means holding said sleeve against longitudinal movement, a tube threadedly engaging the last-named end of said spring and rotatable relative thereto to vary the effective length of said spring, locking means for said tube and sleeve, means for conducting a variable pressure to one side of said bellows, and indicating means operated by expansion and contraction of said bellows.

4. In an instrument of the class described, the combination of a bellows, a fixed support for one end of said bellows, a plurality of balls carried by the opposite end of said bellows, indicating means, a shaft having a plurality of inclined parallel grooves for driving said indicating means, said grooves being engaged by said balls to rotate said shaft with contractions and expansions of said bellows, and means for connecting the interior of said bellows with a source of pressure.

5. An instrument of the class described, comprising an evacuated housing, a bellows located in said housing and attached at one end thereto, means for introducing variable pressures into said bellows, a driving shaft mounted in said housing, means for driving said shaft by expansion and contraction of said bellows, a permanent magnet attached to said shaft, indicating means supported on said housing, said indicating means including a rotatable shaft, and a permanent magnet on said last-named shaft, said magnets being juxtaposed whereby rotation of said driving shaft rotates said second-named shaft.

6. An instrument of the class described, comprising an evacuated housing, a bellows located in said housing and attached at one end thereto, means for introducing variable pressures into said bellows, a driving shaft mounted in said housing, means for driving said shaft by expansion and contraction of said bellows, a permanent magnet attached to said shaft, indicating means supported on said housing, said indicating means including a rotatable shaft, a permanent magnet on said last-named shaft, said magnets being juxtaposed whereby rotation of said driving shaft rotates said second-named shaft, and a casing enclosing said housing and indicating means.

ARTHUR C. ALLEN.

REFERENCES CITED

The following references are of record in the file of this patent:

UNITED STATES PATENTS

| Number | Name | Date |
|---|---|---|
| 15,624 | Shaler | Aug. 26, 1856 |
| 18,655 | Wootten | Nov. 17, 1857 |
| 1,105,051 | Wilkinson | July 28, 1914 |
| 1,287,860 | Bristol et al. | Dec. 17, 1918 |
| 1,328,876 | Hill | Jan. 27, 1920 |
| 1,338,436 | Green | Apr. 27, 1920 |
| 1,340,399 | Ohlson | May 18, 1920 |
| 2,190,530 | Clarkson | Feb. 13, 1940 |
| 2,309,401 | Kollsman | Jan. 26, 1943 |

FOREIGN PATENTS

| Number | Country | Date |
|---|---|---|
| 10,984 | Great Britain | May 10, 1909 |
| 498,357 | Great Britain | Jan. 6, 1939 |